(12) United States Patent
Walia et al.

(10) Patent No.: US 6,636,480 B1
(45) Date of Patent: Oct. 21, 2003

(54) METHOD AND SYSTEM FOR CONTROLLING DATA FLOW THROUGH A MULTIPORT SWITCH

(75) Inventors: Lakhinder Walia, Santa Clara, CA (US); Sanjay Jain, Santa Clara, CA (US); Romulus Pereira, Sunnyvale, CA (US)

(73) Assignee: Riverstone Networks, Inc., Santa Clara, CA (US)

( * ) Notice: Subject to any disclaimer, the term of this patent is extended or adjusted under 35 U.S.C. 154(b) by 0 days.

(21) Appl. No.: 09/392,209

(22) Filed: Sep. 8, 1999

(51) Int. Cl.$^7$ ................................................. H04L 1/00
(52) U.S. Cl. ...................................... 370/229; 370/235
(58) Field of Search ................................ 370/229, 230, 370/235, 235.1, 252, 253, 349, 352, 359, 363, 395.1, 395.41, 395.52, 401, 232, 389, 392, 395.21, 230.1, 233, 395.4, 468, 465

(56) References Cited

U.S. PATENT DOCUMENTS

| | | | |
|---|---|---|---|
| 5,511,066 A | * 4/1996 | Witters et al. | 370/230.1 |
| 5,524,006 A | 6/1996 | Hluchyj et al. | 370/84 |
| 5,666,353 A | 9/1997 | Klausmeier et al. | 370/230 |
| 5,896,511 A | 4/1999 | Manning et al. | |
| 5,953,317 A | * 9/1999 | Ogasawara et al. | 370/232 |
| 5,999,533 A | * 12/1999 | Peres et al. | 370/395.4 |
| 6,324,165 B1 | * 11/2001 | Fan et al. | 370/232 |
| 6,356,565 B1 | * 3/2002 | Bouyer et al. | 370/468 |
| 6,430,156 B1 | * 8/2002 | Park et al. | 370/232 |
| 6,438,134 B1 | * 8/2002 | Chow et al. | 370/412 |

* cited by examiner

Primary Examiner—Douglas Olms
Assistant Examiner—Brian Nguyen
(74) Attorney, Agent, or Firm—Mark A. Wilson

(57) ABSTRACT

A method and a system for controlling data flow through a network device involve regulating a first flow of network traffic with a first traffic control rule, regulating a second flow of network traffic with a second traffic control rule, and then regulating the passed portion of the two flows with a third traffic control rule that is generic to both the first flow and the second flow. The third traffic control rule regulates the passed portions of the first flow and the second flow on an aggregate basis, such that the total amount of traffic passed by the third traffic control rule does not exceed a predefined bandwidth limit. By regulating the bandwidth consumption of a group of flows with at least two levels of traffic control rules, bandwidth consumption can be simultaneously controlled for narrowly defined flows and more broadly defined flows.

20 Claims, 7 Drawing Sheets

METHOD AND SYSTEM FOR CONTROLLING DATA FLOW THROUGH A MULTIPORT SWITCH

TECHNICAL FIELD

The invention relates generally to the control of packet flows through a network device, such as a multiport switch. More particularly, the invention relates to controlling packet flows with multiple bandwidth policing rules.

BACKGROUND OF THE INVENTION

Packet-based networks are now being utilized to deliver a combination of voice, video, and/or data. Because voice, video, and data have different quality of service (QoS) requirements, and because of the inherent bandwidth limitations in most packet-based networks, it is often necessary to break network traffic down into individual flows, so that the bandwidth consumed by each individual flow can be individually regulated.

An individual "flow" is defined as a sequence of packets that have the same characteristics. Characteristics of a flow being transmitted according to the Internet Protocol (IP) are typically identified from the packet headers. For example, in an IP packet, the packet header contains information that may include the source IP address, the destination IP address, the source port number, the destination port number, the type of service, and the IP sub-protocol. Additional flow characteristics may include the port of entry of the packet into the network device. The flow characteristic information is typically utilized to classify incoming traffic into individual flows.

Once incoming traffic has been classified into individual flows, the bandwidth consumed by each flow can be individually regulated by applying a specific traffic control rule to each flow. A traffic control rule typically has a one-to-one relationship to a flow and sets a rate limit, identified as a number of bits, or bytes, per second, that can be passed on, or forwarded, within the network device. FIG. 1 is a depiction of packet traffic within a network device, such as a switch and/or router, that has been broken down into four individual flows, flow A, flow B, flow C, and flow D. Each flow is regulated by a traffic control rule that is specific to the respective flow. For example, flow A is regulated by traffic control rule 1 (TCR 1) 102, flow B is regulated by traffic control rule 2 (TCR 2) 104, flow C is regulated by traffic control rule 3 (TCR 3) 106, and flow D is regulated by traffic control rule 4 (TCR 4) 108. As shown in FIG. 1, there is a one-to-one correspondence between the identified flows and the traffic control rules. Network traffic that does not exceed its allocated bandwidth is passed on within the network device.

In order to provide more control over a particular flow, it may be advantageous to apply more than one traffic control rule to the flow. FIG. 2 is a depiction of four flows that are each regulated by more than one traffic control rule. For example, flow A is regulated by traffic control rule 1 (TCR 1) 202, traffic control rule 5 (TCR 5) 204, and traffic control rule 9 (TCR 9) 206, where each of the traffic control rules are implemented independently of each other. Similar to FIG. 1, there is a one-to-one correspondence from applied traffic control rules to the identified flows. That is, each traffic control rule is applied to one and only one flow. Although the application of more than one traffic control rule to a flow allows for precise control of a flow, it does not allow multiple flows to be regulated as a group. While it is desirable to have the ability to precisely regulate an individual flow, it is also desirable to be able to regulate the aggregate flow of a group of flows.

In prior art network devices, the regulation of a group of flows can only be achieved by designating more generic flows. For example, referring back to FIG. 1, if it is necessary to regulate flows A and B as a group, then the incoming traffic stream must be classified into a more generic flow that includes the flow characteristics of both flow A and flow B. A single traffic control rule can then regulate the more generic flow. While creating a more generic flow classification allows a more generic flow to be regulated by a single traffic control rule, creating a single flow classification eliminates the ability to individually regulate more narrowly defined flows (e.g., flow A, flow B, flow C, and flow D).

In view of the need to regulate the bandwidth consumption of a flow on an individual basis, and in view of the need to regulate the aggregate bandwidth consumption of a group of flows, what is needed is a method and a system that allow the same flow to be regulated on a one-to-one basis and on a group basis.

SUMMARY OF THE INVENTION

A method and a system for controlling data flow through a network device involve regulating a first flow of network traffic with a first traffic control rule, regulating a second flow of network traffic with a second traffic control rule, and then regulating the passed portion of the two flows with a third traffic control rule that is generic to both the first flow and the second flow. The third traffic control rule regulates the passed portions of the first flow and the second flow on an aggregate basis, such that the total amount of traffic passed by the third traffic control rule does not exceed a predefined bandwidth limit. By regulating the bandwidth consumption of a group of flows with at least two levels of traffic control rules, bandwidth consumption can be simultaneously controlled for narrowly defined flows and more broadly defined flows.

In an embodiment, two flows of network traffic are regulated by three traffic control rules, with at least one of the three traffic control rules applying to both of the flows. Initially, the two flows are individually regulated by traffic control rules that apply to the two flows on a one-to-one basis. The two flows are also regulated, on an aggregate basis, by a third traffic control rule that applies to both of the flows. The third traffic control rule is referred to as a "generic," or "coarse," rule because it applies to a broader category of flows.

In an example, a first traffic control rule may apply to a flow from source A of type X, a second traffic control rule may apply to a flow from source B of type X, and a third, more generic, traffic control rule may apply to a flow of type X that is from any source. The third, more generic, traffic control rule is applied to relevant flows on an aggregate basis, such that the combined bandwidth consumed by all flows within the generic category does not exceed the limit enforced by the third traffic control rule.

In operation, if the third traffic control rule is implemented as, for example, a token bucket, then the same bucket is decremented each time a packet is passed by the third traffic control rule, regardless of which flow the packet is from. In an embodiment, the third traffic control rule is applied to the two flows on a first come first serve basis, such that the available bandwidth is allocated to the first arriving packets. As a result of applying the same traffic control rule to the aggregate of two flows, the two flows are regulated as a group. The regulation of a group of flows is in addition to the regulation of individual flows that is provided by the lower level traffic control rules.

It should be appreciated that more than two flows can be regulated by a generic traffic control rule. In addition, more than two levels of traffic control rules can be implemented. Moreover, it is not necessary to regulate each flow with the same number of traffic control rules.

The application of traffic control rules to multiple flows on an aggregate basis is preferably implemented in hardware. In an embodiment, an application specific integrated circuit (ASIC), that is capable of applying traffic control rules to more than one flow on an aggregate basis, includes a flow classifier, a rule selector, and various traffic control units. The flow classifier is a hardware based unit that takes an incoming stream of packets and classifies the packets by flow. The flow classifier utilizes header information and the port of entry from incoming packets to classify flows.

The rule selector is a functional unit that matches flows to traffic control units. The traffic control units are the dedicated circuits that implement the different traffic control rules.

In operation, packets entering the ASIC are classified into flows by the flow classifier. The rule selector then identifies the traffic control units that are to be applied to the classified flows. The traffic control units then regulate the flows according to the bandwidth limits of the respective traffic control rule. If more than one flow is mapped to the same traffic control unit, then the traffic control unit regulates all applicable flows on an aggregate basis. Packets from flows that meet all applicable traffic control rules are forwarded from the ASIC to a next location. In a preferred embodiment, the system and method are utilized to regulate network traffic before the traffic is passed through a switch fabric of a switch or router.

DETAILED DESCRIPTION

Figure 1:
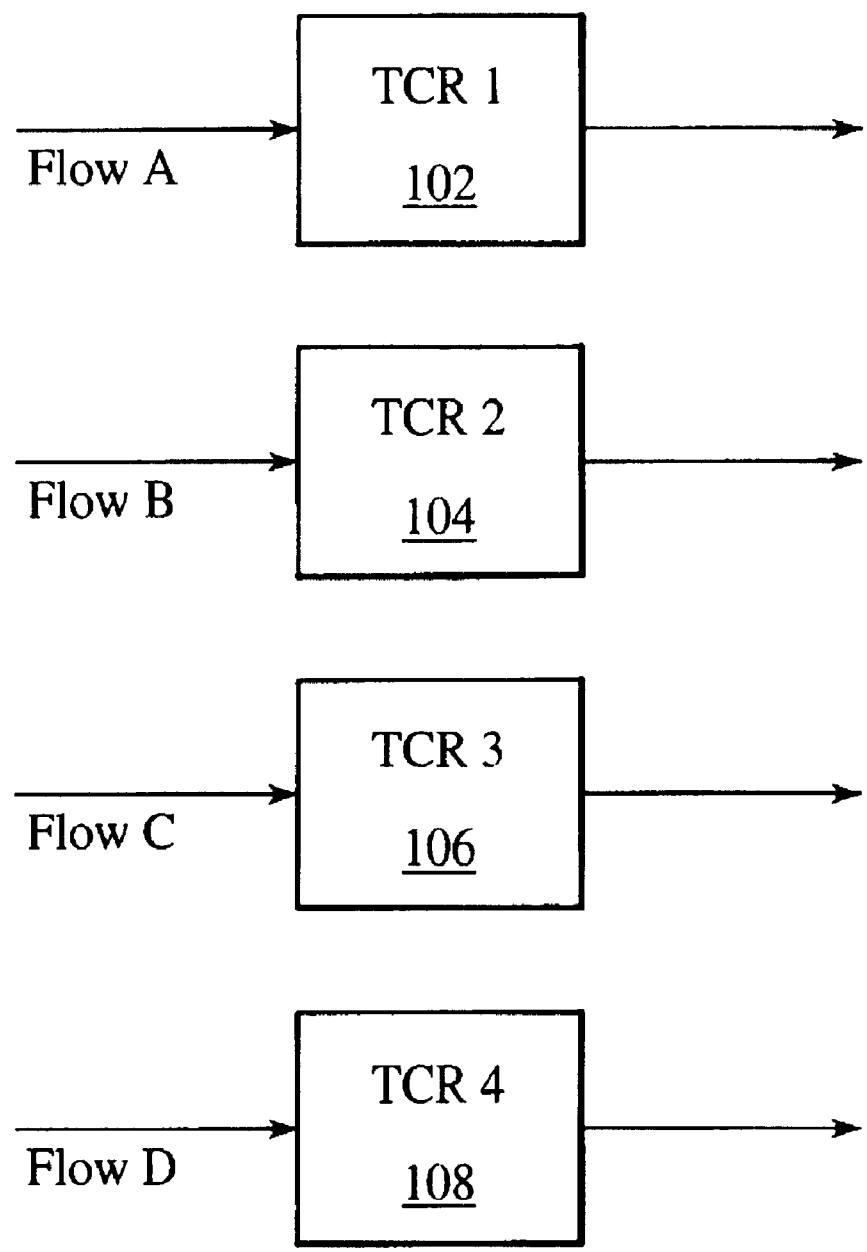
FIG. 1 is a depiction of four flows that are individually regulated by dedicated traffic control rules, where there is a one-to-one correspondence between flows and traffic control rules, as is known in the prior art.
Figure 2:
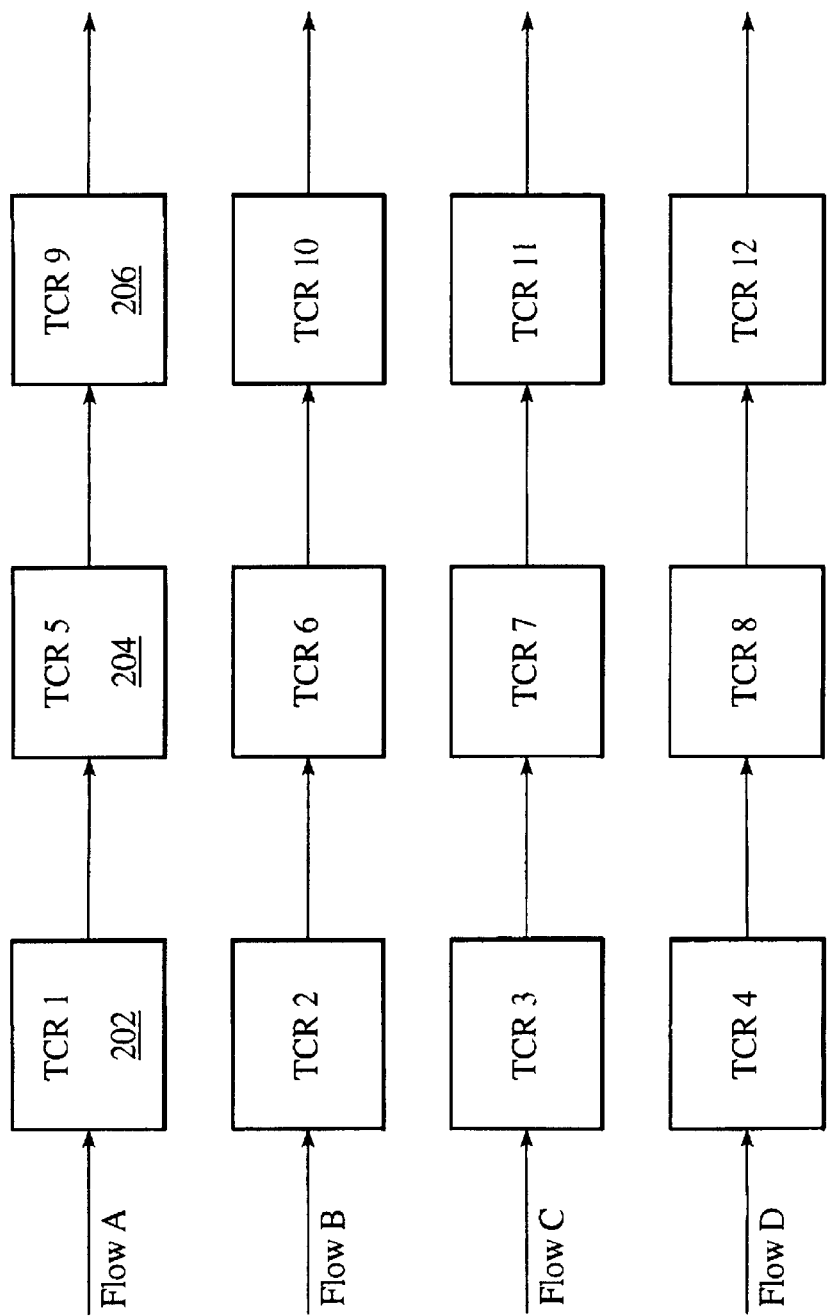
FIG. 2 is a depiction of four flows that are individually regulated by more than one traffic control rule, where there is a one-to-one correspondence between flows and traffic control rules, as is known in the prior art.
Figure 3:
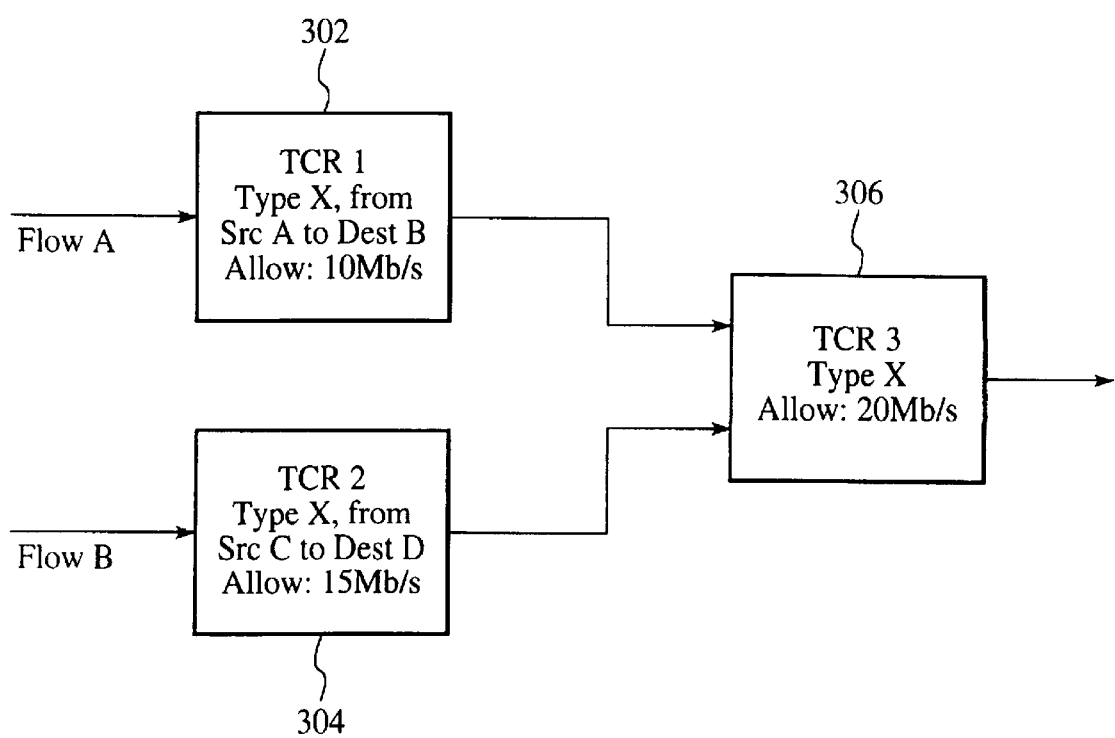
FIG. 3 is a depiction of the regulation of two flows that are individually regulated by dedicated traffic control rules, and regulated as a group by a traffic control rule that is generic to both of the flows, in accordance with the invention.

FIG. 3 is a depiction of the regulation of two flows within a network device, such as a switch or a router. Regulation of the two flows involves three traffic control rules 302, 304, and 306, with at least one of the three traffic control rules applying to both of the flows. As shown in FIG. 3, two previously classified flows are initially regulated by respective traffic control rules. Specifically, flow A is regulated by traffic control rule 1 (TCR 1) 302 and flow B is regulated by traffic control rule 2 (TCR 2) 304. The two traffic control rules apply to the respective flows on a one-to-one basis.

In the example of FIG. 3, it is assumed that the flows are made up of variable-length packets that are transmitted in accordance with the Internet protocol (IP). In addition, the variable-length packets are preferably transmitted according to Ethernet protocol. Although an embodiment is described with reference to IP, variable-length packets, and Ethernet protocol, other transmission protocols are possible. For example, the flows may be comprised of fixed-length cells that are transmitted in accordance with asynchronous transfer mode (ATM) protocol.

For example purposes, it is assumed that flow A is of type X (e.g., as identified by the IP sub-protocol and socket numbers), is from source IP address A (Src A), is traveling to destination IP address B (Dest B), and that traffic control rule 1 regulates a flow, having no conflicting transmission characteristics, to 10 megabits per second (Mb/s) or less (Allow: 10 Mb/s). In addition, it is assumed that flow B is of type X, is from source IP address C (Src C), is traveling to Destination IP address D (Dest D), and that traffic control rule 2 regulates a flow having the same transmission characteristics to 15 Mb/s or less (Allow: 15 Mb/s). The result of applying traffic control rule 1 to flow A is that flow A is limited to 10 Mb/s, and the result of applying traffic control rule 2 to flow B is that flow B is limited to 15 Mb/s.

As shown in FIG. 3, traffic control rule 3 (TCR 3) 306 regulates traffic flows of type X, regardless of the source IP address or the destination IP address, to 20 Mb/s or less (Allow: 20 Mb/s). Traffic control rule 3 is referred to as a more "generic", or more "coarse," rule than traffic control rules 1 and 2 because traffic control rule 3 regulates a broader group of flows. Since both flow A and Flow B fall within the classification of traffic control rule 3 (e.g., both of the flows are of type X), both of the flows can also be regulated by traffic control rule 3. As depicted in FIG. 3, the output of flow A from traffic control rule 1 is regulated by traffic control rule 3, and the output of flow B from traffic control rule 2 is regulated by traffic control rule 3. That is, the same traffic control rule (traffic control rule 3) is now utilized to regulate two flows. Although traffic control rule 3 is described as regulating two flows, the traffic control rule (TCR3) may also be described as regulating a single flow that is characterized such that the single flow includes two, more narrowly, defined flows.

Because traffic control rule 1 allows flow A to pass at up to 10 Mb/s, and because traffic control rule 2 allows flow B to pass at up to 15 Mb/s, under maximum traffic conditions, traffic control rule 3 may receive up to 25 Mb/s from the combination of flow A and flow B. Although traffic control rule 3 may receive up to 25 Mb/s, application of traffic control rule 3 to flows A and B limits the aggregate of flows A and B to a maximum of 20 Mb/s.

In operation, if traffic control rule 3 is implemented as, for example, a token bucket, then the same bucket is decremented each time a packet is passed by traffic control rule 3, whether or not the packet is from flow A or flow B. That is, the output of traffic control rule 3 is a flow of type X that does not exceed 20 Mb/s on an aggregate basis. As long as the flow resulting from traffic control rule 3 does not exceed 20 Mb/s, the flow may include packets from either flow A or flow B. In an embodiment, traffic control rule 3 is applied to flows A and B on a first come first serve basis, such that the available bandwidth is allocated to the first arriving packets.

As a result of applying the same traffic control rule to flows A and B on an aggregate basis, flows A and B are regulated as a group. The regulation of a group of flows is in addition to the regulation of individual flows that is provided by the lower level traffic control rules (e.g., traffic control rule 1 and traffic control rule 2). Although flows A and B are regulated by traffic control rule 3 on an aggregate basis, flows A and B are not initially multiplexed into a single flow for regulation by traffic control rule 3. That is, flows A and B are regulated by traffic control rule 3 as individual flows, however traffic control rule 3 is only concerned about the total bandwidth consumed by the combination of flows A and B.

Figure 4:
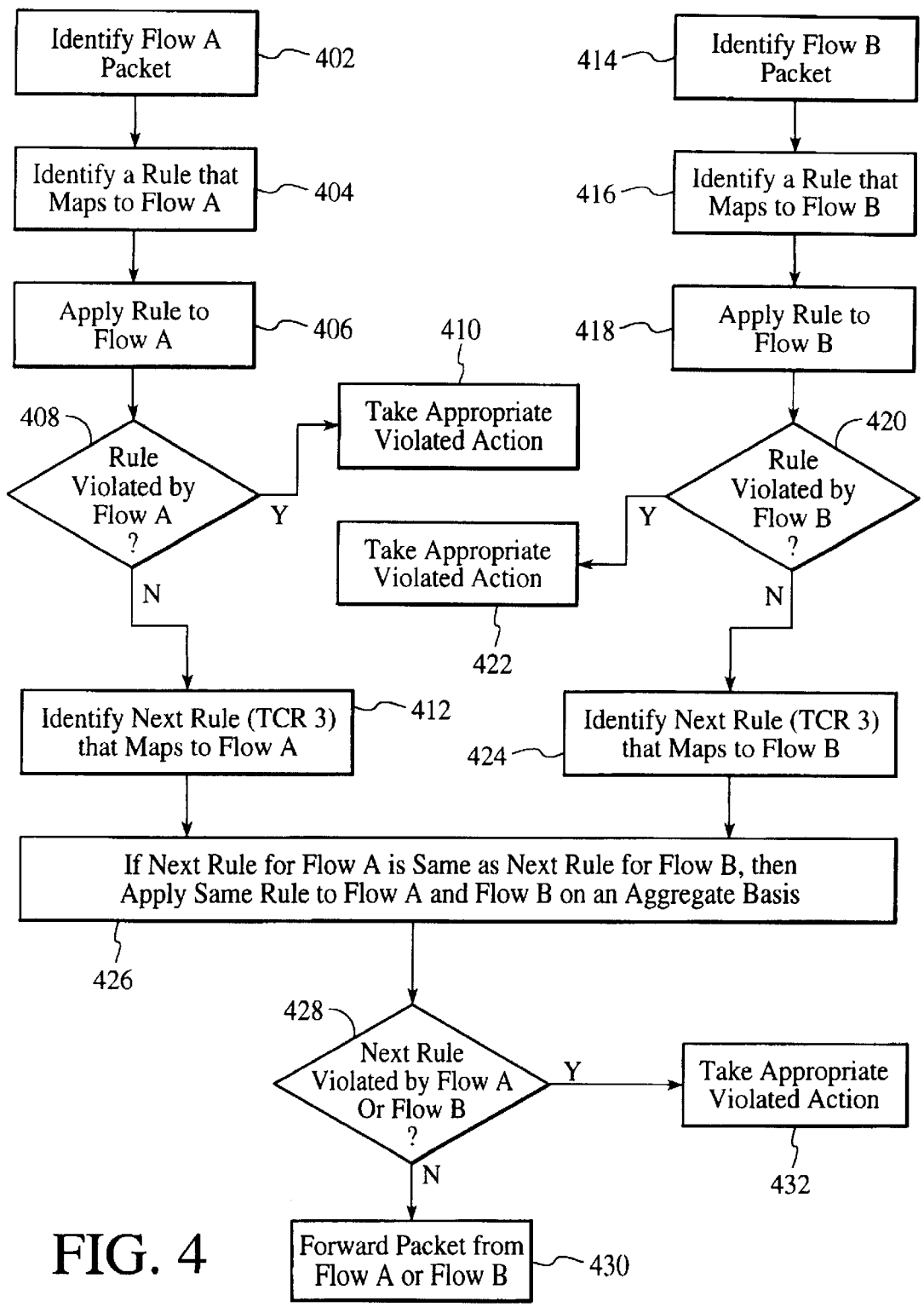
FIG. 4 is a process flow diagram representing the regulation of two flows that are individually regulated by dedicated traffic control rules, and regulated as a group by a traffic control rule that is generic to both of the flows, in accordance with the invention.

FIG. 4 is a process flow diagram that represents the application of multiple rules to at least two flows. The process flow diagram of FIG. 4 is related to the logic diagram of FIG. 3, with the same flows (flows A and B) and the same traffic control rules (traffic control rule 1, traffic control rule 2, and traffic control rule 3) being identified. Referring to FIG. 4, at step 402, a flow A packet is identified. In an embodiment, flow A is identified by a hardware-based flow classifier that is resident within the network device, although this is not critical. In an embodiment, flow classification may involve identifying any flow parameters that are utilized with the various transmission protocols. For example, flow parameters for classification may include the port of entry into the network device, the source IP address, the destination IP address, the source port number (socket), the destination port number (socket), the type of service, the protocol, and/or fragmentation information.

At step 404, a traffic control rule that maps to flow A is identified (e.g. TCR 1). Mapping a traffic control rule to a flow may involve identifying a pointer that points to a first traffic control rule. In a preferred embodiment, a flow maps to more than one traffic control rule. For example, a flow may map to a first traffic control rule, to a second traffic control rule, and even to a third traffic control rule. Although three levels of traffic control rules are described, more levels are possible. In a preferred embodiment, each subsequent traffic control rule is a more generic traffic control rule, although this is not a requirement.

Referring to Step 406, once a first traffic control rule has been identified for flow A, the traffic control rule is applied to the flow, and more specifically, the traffic control rule is applied to each packet that makes up the flow. At decision point 408, if traffic control rule 1 is violated by flow A (e.g., if the rate of flow A exceeds the allocated bandwidth), then the appropriate violated action is taken (Step 410). The violated action may involve dropping the packet, or packets, that violate the traffic control rule, or the violated action may involve, for example, incrementing a violated counter, reducing the priority of the packet(s), changing the type of service (ToS) of the packet(s), and/or altering the packets in some other way. If a packet that violates the traffic control rule is not dropped, subsequent traffic control rules may be applied to the packet, as described below.

If the traffic control rule is not violated by flow A (e.g., if the traffic rate for flow A does not exceed the allocated bandwidth), then the next rule that maps to flow A is identified (Step 412). In this case, it is assumed, for example purposes, that the next traffic control rule for flow A is traffic control rule 3. In cases where the violated action does not require dropping packets, packets that violate the traffic control rule may also need to be regulated by traffic control rule 3.

Referring back to the top of FIG. 4, the same initial process that applied to flow A applies to flow B, except that flow B initially maps to traffic control rule 2.

Referring to step 414, a flow B packet is identified. At step 416, a traffic control rule that maps to flow B is identified (e.g., TCR 2). Once the traffic control rule is identified for flow B, the traffic control rule is applied to flow B (Step 418), and more specifically, the traffic control rule is applied to each packet that makes up the flow. At decision point 420, if traffic control rule 2 is violated by flow B, then the appropriate violated action is taken (Step 422). Again, a violated action may involve dropping the packet, or packets, that violate the traffic control rule. If a packet that violates the traffic control rule is not dropped, subsequent traffic control rules may be applied to the packet, as described below. It should be noted that the violated action for flow A is preferably independent from the violated action for flow B, although this is not critical.

If the traffic control rule is not violated by flow B, then the next rule that maps to flow B is identified (Step 424). In this case, it is assumed, for example purposes, that the next traffic control rule for flow B is the same as the next traffic control rule for flow A. As described with reference to FIG. 3, the same traffic control rule can apply to two flows when the parameter, or parameters, regulated by the traffic control rule are generic to both flows. Although not shown in FIGS. 3 and 4, a single traffic control rule can also apply to more than two flows at the same time.

At step 426, in the case when the next traffic control rule for flow A is the same as the next traffic control rule for flow B, the same traffic control rule (TCR 3) is applied to both flows. Application of the traffic control rule to flows A and B is done on an aggregate basis, such that the total bandwidth allocated by the traffic control rule (TCR 3) is not exceeded by the total of flows A and B. When, for example, the traffic control rule is implemented with a token bucket, the same token bucket is decremented each time the traffic control rule allows a packet to pass, whether the packet is from flow A or from flow B.

Referring to decision point 428, if traffic control rule 3 is not violated by a flow A packet, then the flow A packet is forwarded to a next location (Step 430). If traffic control rule 3 is violated by a flow A packet, then the appropriate violated action is taken (Step 432). Again, the violated action may involve dropping the packet, or, for example, lowering the priority of the packet, and then forwarding the packet to a next location. The same process is carried out for each flow B packet. Referring again to decision point 428, if traffic control rule 3 is not violated by a flow B packet, then the flow B packet is forwarded to a next location (Step 430). If traffic control rule 3 is violated by a flow B packet, then the appropriate violated action is taken (Step 432). Although FIG. 4 only depicts two levels of traffic control rules, it should be appreciated that more levels of traffic control rules are possible. If more levels of traffic control rules are present, then at step 430, packets are policed by another traffic control rule, or rules, instead of being forwarded through the network device.

Figure 5:
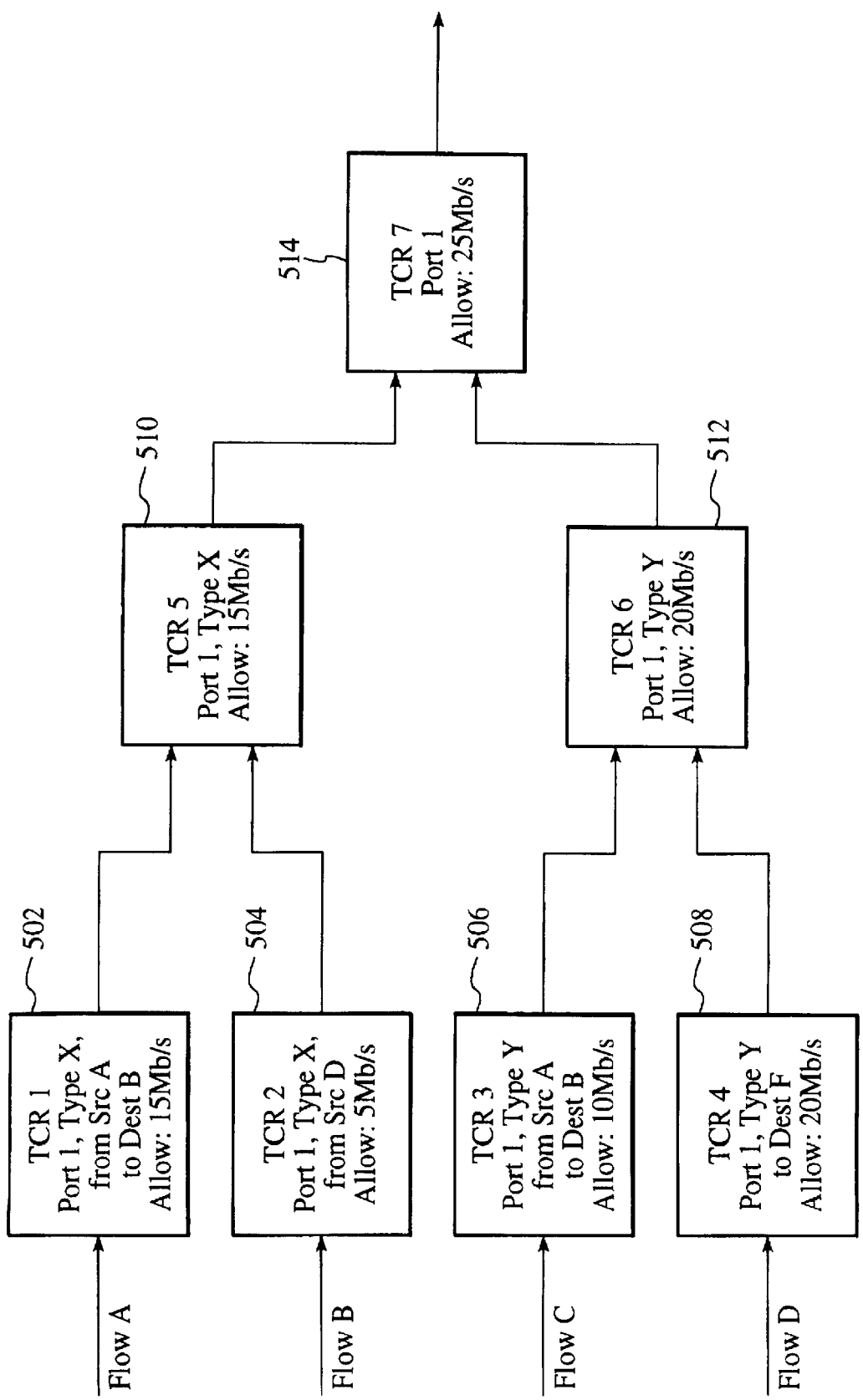
FIG. 5 is a depiction of the regulation of four flows that are individually regulated by dedicated traffic control rules, and regulated in various groups by traffic control rules that are generic to the groups, in accordance with the invention.

FIG. 5 is a depiction of the regulation of four; individual flows that involves three levels of traffic control rules. As shown in the example of FIG. 5, four previously classified flows (flow A, flow B, flow C, and flow D) are initially regulated on a one-to-one basis by four traffic control rules (traffic control rule 1, traffic control rule 2, traffic control rule 3, and traffic control rule 4) 502, 504, 506, and 508. For example purposes, it is assumed that flow A is received into a network device on port 1, is of type X, is from source IP address A, and is traveling to destination IP address B. Likewise, it is assumed that traffic control rule 1 limits a flow, having the same characteristics as flow A, to 15 Mb/s. Flow B is received on port 1, is of type X, is from source IP address D, and is unspecified as to destination IP address. Traffic control rule 2 limits a flow, having the same characteristics as flow B, to 5 Mb/s. Flow C is received on port 1, is of type Y, is from source IP address A, and is traveling to destination IP address B. Traffic control rule 3 limits a flow, having the same characteristics as flow C, to 10 Mb/s. Flow D is received on port 1, is of type Y, is from an unspecified source IP address, and is traveling to destination IP address F. Traffic control rule 4 limits a flow, having the same characteristics as flow D, to 20 Mb/s. Flows A, B, C, and D have various similar characteristics. For example, flows A and B are both of type X, and flows C and D are both of type Y. One similarity between all four flows is that they all enter the network device on port 1.

As shown in FIG. 5, each flow is initially regulated by a flow-specific traffic control rule. That is, flow A is initially regulated by traffic control rule 1, flow B is initially regulated by traffic control rule 2, and so on. Because flow A and flow B are both received from port 1 and are both of type X, they can both be regulated by a single traffic control rule 510 that is generic to both flows. For example purposes, it is assumed that traffic control rule 5 regulates flows from port 1 and of type X to 15 Mb/s or less. Traffic control rule 5 can regulate all flows from port 1 and of type X, regardless of any other differences that may exist between flow characteristics. Traffic control rule 5 regulates the output of flow A from traffic control rule 1, and the output of flow B from traffic control rule 2, on an aggregate basis. Although lower level traffic control rules are shown for each specific flow, lower level traffic control rules may not be utilized for every flow.

Likewise, because flow C and flow D are both received from port 1 and are both of type Y, they can be regulated by a single traffic control rule 512 that is generic to both flows. For example purposes, it is assumed that traffic control rule 6 regulates flows from port 1 and of type Y to 20 Mb/s or less. Traffic control rule 6 can regulate all flows from port 1 and of type Y, regardless of any other differences that may exist between flow characteristics. Traffic control rule 6 regulates the output of flow C from traffic control rule 3, and the output of flow D from traffic control rule 4, on an aggregate basis.

Because flows A, B, C, and D are all from port 1, they can also be regulated by a single traffic control rule 514 that is generic to all four flows. For example purposes, it is assumed that traffic control rule 7 regulates flows from port 1 to 25 Mb/s or less. Traffic control rule 7 can regulate all flows from port 1, regardless of any other differences that may exist between flow characteristics. As shown in FIG. 5, traffic control rule 7 regulates the output of flows A and B from traffic control rule 5 and the output of flows C and D from traffic control rule 6. Traffic control rule 7 is implemented on an aggregate basis as described above. That is, each packet passed by traffic control rule 7, regardless of which flow it originated from, is counted against the bandwidth that is allocated by traffic control rule 7. As a result of the three levels of traffic control rules, flows can be individually regulated, regulated as a group based on flow type, and regulated as a group based on the port of entry.

Figure 6:
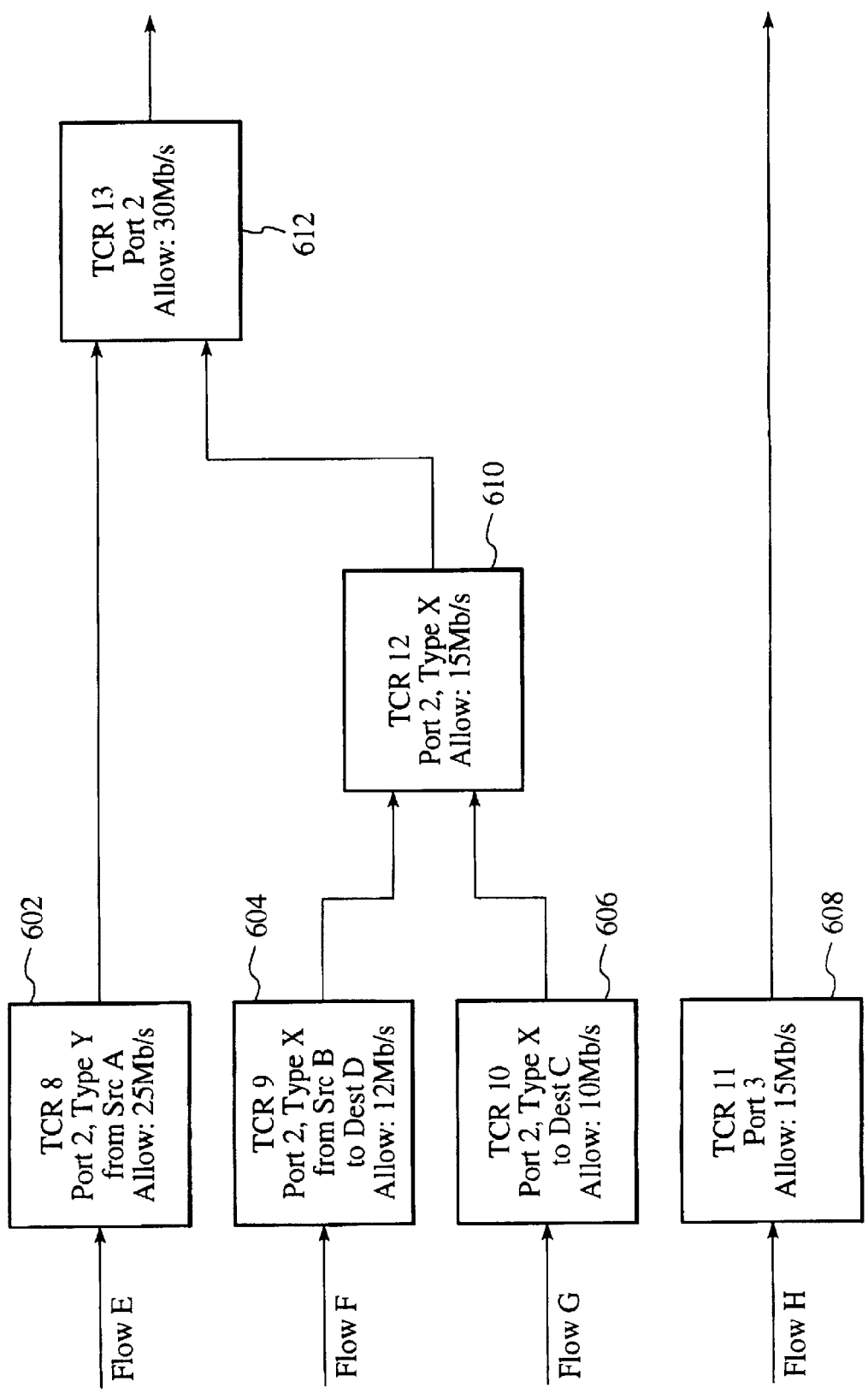
FIG. 6 is a depiction of the regulation of four flows that are individually regulated by dedicated traffic control rules, and regulated in various groups by traffic control rules that are generic to the groups, in accordance with the invention.

FIG. 6 is another depiction of the regulation of four individual flows that involves up to three levels of traffic control rules. In the example of FIG. 6, four previously classified flows (flow E, flow F, flow G, and flow H) are initially regulated on a one-to-one basis by four traffic control rules (traffic control rule 8, traffic control rule 9, traffic control rule 10, and traffic control rule 11) 602, 604, 606, and 608. For example purposes, it is assumed that flow E is received from port 2, is of type Y, is from source IP address A, and is unspecified as to the destination IP address. It is also assumed that traffic control rule 8 limits a flow, having the same characteristics as flow E, to 25 Mb/s. Flow F is from port 2, is of type X, is from source IP address B, and is traveling to destination IP address D. Traffic control rule 9 limits a flow, having the same characteristics as flow B, to 12 Mb/s. Flow G is from port 2, is of type X, is from an unspecified source IP address, and is traveling to destination IP address C. Traffic control rule 10 limits a flow, having the same characteristics as flow G, to 10 Mb/s. Flow H is broadly classified as being from port 3. Traffic control rule 11 limits a flow, having the same characteristics as flow H, to 15 Mb/s or less.

Because flow F and flow G are from the same port (Port 2) and are of the same type (Type X), the two flows can, if necessary, be regulated by a generic traffic control rule 610. For example, traffic control rule 12 limits flows from port 2 and of type X, to 15 Mb/s or less, regardless of the source IP address and the destination IP address. As shown in FIG. 6, flows F and G are regulated by traffic control rule 12 on an aggregate basis, and as a result a maximum of 15 Mb/s is allowed to be forwarded.

Because flow E, flow F, and flow G are from the same port (port 2), the three flows can, if necessary, be regulated by a traffic control rule 612 that is generic to port 2. For example, traffic control rule 13 limits the flow from port 2 to 30 Mb/s or less, regardless of the type of flow or the source and destination IP addresses of the incoming flows. Referring to FIG. 6, traffic control rule 13 regulates the output of flow E from traffic control rule 8 and the aggregate output of flows F and G from traffic control rule 12. Flow E, flow F, and flow G are regulated by traffic control rule 13 on an aggregate basis. Flow H is not regulated by traffic control rule 12 or traffic control rule 13 because the characteristics of flow H do not correspond to the characteristics of traffic control rule 12 or traffic control rule 13. Specifically, traffic control rules 12 and 13 regulate flows from port 2 while flow H is from port 3. As depicted in FIG. 6, it is not necessary to regulate each flow with the same number of traffic control rules. In addition, it is not necessary to regulate each flow with the same level of specificity. For example, some flows may be initially regulated with lower levels of specificity than other flows that fit within a common, more generic, flow classification. Further, the same traffic control rule can directly regulate more than two flows. For example, traffic control rule 12 may regulate any flows that fit within the flow classification of traffic control rule 12.

Figure 7:
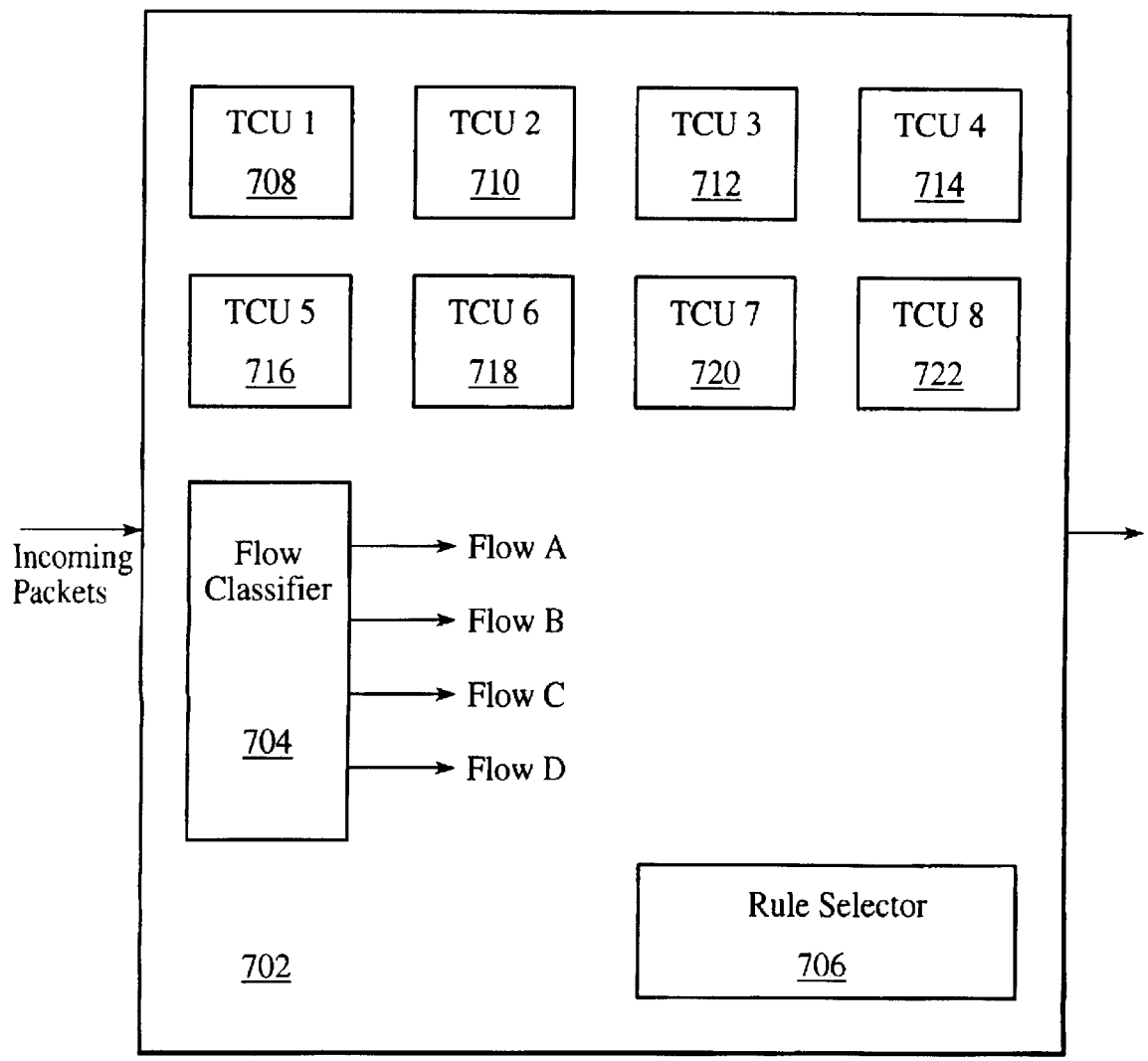
FIG. 7 is a depiction of an application specific integrated circuit that regulates individual flows with flow-specific traffic control rules, and regulates groups of flows with generic traffic control rules, in accordance with the invention.

The application of traffic control rules to multiple flows on an aggregate basis is preferably implemented in hardware. FIG. 7 is a depiction of an application specific integrated circuit (ASIC) 702 that is capable of applying traffic control rules to more than one flow on an aggregate basis, as described above. The ASIC includes a flow classifier 704, a rule selector 706, and various traffic control units 708, 710, 712, 714, 716, 718, 720, and 722. The flow classifier is a hardware based unit that takes incoming packets and classifies the packets by flow. For example, the flow classifier may break packets down into flows A, B, C, and D. The flow classifier utilizes header information from incoming packets to classify flows. In a preferred embodiment, the flow classifier can identify up to 256,000 unique flows.

The rule selector 706 is a functional unit that matches flows to traffic control units. Preferably, the rule selector includes a pointer that maps a flow to a particular traffic control rule or chain of traffic control rules. For example, flow A may be mapped, by the rule selector, to traffic control rule 1, then to traffic control rule 3, and then to traffic control rule 8.

The traffic control units 708, 710, 712, 714, 716, 718, 720, and 722 are the dedicated circuits that implement the different traffic control rules. Referring to FIG. 7, each of the traffic control units (TCUs), TCU 1 through TCU 8, implements a traffic control rule. The traffic control units are utilized to regulate flows that map to the traffic control rules. Although traffic control rules primarily regulate bandwidth allocation, the traffic control rules may specify some additional criteria. In addition, although a traffic control rule implemented as a token bucket is described above, other traffic control rule implementations are possible.

In operation, a stream received into the ASIC 702 of FIG. 7 is classified into flows by the flow classifier 704. The rule selector 706 then identifies the traffic control units 708, 710, 712, 714, 716, 718, 720, and 722 that are to be applied to the identified flows. The traffic control units then regulate the flows according to the bandwidth limits of the respective traffic control rule. If more than one flow is mapped to the same traffic control unit, then the traffic control unit regulates all applicable flows on an aggregate basis. Packets from flows that meet all applicable traffic control rules are forwarded from the ASIC to a next location. In a preferred embodiment, the system and method are utilized to regulate network traffic before the traffic is passed through a switch fabric of a switch or router.

What is claimed is:

1. A method for controlling data flow through a network device comprising the steps of:
   receiving network traffic into said network device;
   identifying a first flow from said network traffic;
   identifying a second flow that is unique from said first flow, said second flow being identified from said network traffic;
   identifying traffic control rules that apply to said first flow wherein identifying traffic control rules that apply to said first flow includes mapping said first flow to a chain of traffic control rules, with each subsequent traffic control rule in said chain being more generic than the previous traffic control rule in said chain, said first flow being mapped to a first traffic control rule and then to a third traffic control rule;
   identifying traffic control rules that apply to said second flow, wherein identifying traffic control rules that apply to said second flow includes mapping said second flow to a chain of traffic control rules, with each subsequent traffic control rule in said chain being more generic than the previous traffic control rule in said chain, said second flow being mapped to a second traffic control rule and then to said third traffic control rule;
   applying said first traffic control rule to said first flow;
   applying said second traffic control rule to said second flow; and
   applying said third traffic control rule to said first flow and to said second flow on an aggregate basis.

2. The method of claim 1 further including steps of:
   forwarding a packet from said first flow only if said first traffic control rule and said third traffic control rule are not violated by said packet from said first flow; and
   forwarding a packet from said second flow only if said second traffic control rule and said third traffic control rule are not violated by said packet from said second flow.

3. The method of claim 2 wherein said step of applying said third traffic control rule includes a step of decrementing a counter upon forwarding said packet from said first flow or upon forwarding said packet from said second flow.

4. The method of claim 2 further including the steps of:
   identifying a third flow that is unique from said first flow and said second flow, said third flow being identified from said. network traffic;
   identifying a fourth traffic control rule that applies to said first flow, said second flow, and said third flow;
   applying said fourth traffic control rule to packets from said first flow that do not violate either said first traffic control rule or said third traffic control rule, to packets from said second flow that do not violate either said second traffic control rule or said third traffic control rule, and to packets from said third flow, on an aggregate basis.

5. The method of claim 4 further including the steps of:
   identifying a fifth traffic control rule that applies to said third flow; and
   applying said fifth traffic control rule to said third flow before said fourth traffic control rule is applied to said third flow.

6. The method of claim 1 wherein said third traffic control rule is more generic than said first traffic control rule or said second traffic control rule.

7. The method of claim 1 wherein said steps of identifying said first flow and said second flow include steps of accessing packet header information to determine transmission characteristics of packets from said network traffic.

8. The method of claim 7 wherein said step of accessing packet header information includes a step of identifying at least one of:
   a source IP address;
   a destination IP address;
   a source port number; and
   a destination port number.

9. The method of claim 1 wherein said steps of:
   identifying said first traffic control rule includes a step of identifying a traffic control rule that has no conflicting flow parameters between said first flow and said first traffic control rule;
   identifying said second traffic control rule includes a step identifying a traffic control rule that has no conflicting flow parameters between said second flow and said second traffic control rule; and
   identifying said third traffic control rule includes a step of identifying a traffic control rule that has no conflicting flow parameters between said first flow and said third traffic control rule and between said second flow and said third traffic control rule.

10. A system for controlling data flow through a network device comprising:
    means for identifying a first flow and a second flow from a stream of network traffic, said first flow having a transmission characteristic that is different from said second flow;

means for;
  identifying a first traffic control rule that applies to said first flow;
  identifying a second traffic control rule that applies to said second flow; and
  identifying a third traffic control rule that applies to said first flow and to said second flow;
  said means for identifying traffic control rules including pointers that map said first and second flows to respective chains of traffic control rules, with each subsequent traffic control rule in said respective chains being more generic than the previous traffic control rule in said respective chains;
means for applying said first traffic control rule to said first flow in order to regulate bandwidth consumption by said first flow;
means for applying said second traffic control rule to said second flow in order to regulate bandwidth consumption by said second flow;
means for applying said third traffic control rule to said first flow and to said second flow on an aggregate basis, in order to regulate bandwidth consumption by both said first flow and said second flow.

11. The system of claim 10 further including means for forwarding a packet from said first flow if said packet from said first flow does not violate said first traffic control rule or said third traffic control rule, and for forwarding a packet from said second flow if said packet from said second flow does not violate said second traffic control rule or said third traffic control rule.

12. The system of claim 10 wherein said means for identifying a first flow and a second flow includes an input for receiving variable-length packets.

13. The system of claim 10 wherein said means for identifying a first flow and a second flow includes an input for receiving fixed-length cells.

14. A method for controlling data flow through a network device comprising the steps of:
  identifying a first flow of packets by accessing header information contained within said packets of said first flow;
  identifying a second flow of packets by accessing header information contained within said packets of said second flow;
  identifying traffic control rules that apply to said first flow of packets, wherein identifying traffic control rules that apply to said first flow of packets includes mapping said first flow of packets to a chain of traffic control rules with each subsequent traffic control rule in said chain being more generic than the previous traffic control rule in said chain, said first flow of packets being mapped to a first traffic control rule and then to a third traffic control rule;
  identifying traffic control rules that apply to said second flow of packets, wherein identifying traffic control rules that apply to said second flow of packets includes mapping said second flow of Packets to a chain of traffic control rules, with each subsequent traffic control rule in said chain being more generic than the previous traffic control rule in said chain, said second flow of packets being mapped to a second traffic control rule and then to a third traffic control rule;
  applying said first traffic control rule to said first flow of packets and determining if said first traffic control rule has been violated by a packet from said first flow of packets;
  applying said second traffic control rule to said second flow of packets and determining if said second traffic control rule has been violated by a packet from said second flow of packets; and
  applying said third traffic control rule to said first flow of packets and to said second flow of packets on an aggregate basis and determining if said third traffic control rule has been violated by said packet from said first flow of packets or by said packet from said second flow of packets.

15. The method of claim 14 further including the steps of:
  forwarding said packet from said first flow of packets if said packet from said first flow does not violate said first traffic control rule or said third traffic control rule; and
  forwarding said packet from said second flow of packets if said packet from said second flow does not violate said second traffic control rule or said third traffic control rule.

16. The method of claim 14 wherein said step of identifying a first traffic control rule includes a step of identifying a first traffic control rule that applies to said first flow of packets and not to said second flow of packets, and wherein said step of identifying a second traffic control rule includes a step of identifying a second traffic control rule that applies to said second flow of packets and not to said first flow of packets.

17. The method of claim 16 wherein said third traffic control rule applies to a larger number of flows than said first traffic control rule or said second traffic control rule.

18. The method of claim 14 wherein said steps of identifying said first and said second flow of packets include steps of classifying said first and second flow of packets by at least one of:
  a source IP address;
  a destination IP address;
  a source port number;
  a destination port number;
  protocol; and
  type of service.

19. The method of claim 14 further including the steps of:
  identifying a third flow of packets by accessing header information contained within said packets of said first flow;
  identifying a fourth traffic control rule that applies to said first flow of packets, said second flow of packets, and said third flow of packets;
  applying said fourth traffic control rule to packets from said first flow of packets that do not violate either said first traffic control rule or said third traffic control rule, to packets from said second flow of packets that do not violate either said first traffic control rule or said third traffic control rule, and to packets from said third flow of packets, on an aggregate basis.

20. The method of claim 19 further including the steps of:
  identifying a fifth traffic control rule that applies to said third flow of packets; and
  applying said fifth traffic control rule to said third flow of packets before said fourth traffic control rule is applied to said third flow of packets.

* * * * *